United States Patent
Gormley

(10) Patent No.: US 9,306,817 B2
(45) Date of Patent: Apr. 5, 2016

(54) METHOD AND SYSTEM FOR MEASURING AVAILABILITY IN A COMMUNICATIONS NETWORK

(71) Applicant: Eden Rock Communications, LLC, Bothell, WA (US)

(72) Inventor: Eamonn Gormley, Bothell, WA (US)

(73) Assignee: Nokia Solutions and Networks OY, Espoo (FI)

(*) Notice: Subject to any disclaimer, the term of this patent is extended or adjusted under 35 U.S.C. 154(b) by 175 days.

(21) Appl. No.: 13/873,148

(22) Filed: Apr. 29, 2013

(65) Prior Publication Data

US 2013/0286871 A1     Oct. 31, 2013

Related U.S. Application Data

(60) Provisional application No. 61/639,861, filed on Apr. 28, 2012.

(51) Int. Cl.
*H04L 12/26* (2006.01)
*H04L 12/24* (2006.01)

(52) U.S. Cl.
CPC ............ *H04L 43/06* (2013.01); *H04L 41/5009* (2013.01); *H04L 43/0805* (2013.01)

(58) Field of Classification Search
None
See application file for complete search history.

(56) References Cited

U.S. PATENT DOCUMENTS

| | | | |
|---|---|---|---|
| 2007/0081543 A1* | 4/2007 | Brenes et al. | 370/401 |
| 2008/0020785 A1 | 1/2008 | Liu et al. | |
| 2008/0317225 A1* | 12/2008 | Cotignola et al. | 379/93.05 |
| 2009/0064255 A1* | 3/2009 | Jiang et al. | 725/118 |
| 2009/0154359 A1 | 6/2009 | Strutt et al. | |
| 2010/0216407 A1 | 8/2010 | Gormley | |
| 2012/0003989 A1* | 1/2012 | Gravino | 455/456.1 |

FOREIGN PATENT DOCUMENTS

EP        2151965 A1       2/2010
KR    10-2007-0080182 A    8/2007

OTHER PUBLICATIONS

International Search Report and Written Opinion for PCT/US2013/038699, filed on Apr. 29, 2013.

* cited by examiner

*Primary Examiner* — Awet Haile

(57) ABSTRACT

In a system for availability metrics for customer premises equipment (CPE), CPE includes a non-volatile memory and a timer. Service availability interruption events and time stamps associated with the events are recorded in the non-volatile memory and transmitted to a computing device, which calculates availability metrics based on the interruption events and time stamps from the non-volatile memory of the CPE.

11 Claims, 6 Drawing Sheets

METHOD AND SYSTEM FOR MEASURING AVAILABILITY IN A COMMUNICATIONS NETWORK

CROSS-REFERENCES TO RELATED APPLICATIONS

The present invention claims priority to and is a non-provisional of U.S. Application No. 61/639,861, filed Apr. 28, 2012. That application is herein incorporated by reference for all purposes.

BACKGROUND OF THE INVENTION

Some of the key operational metrics of a communications network are the availability of each of the components in the network, the availability of a group of components and the service availability that the network provides for end users. While the theory of availability prediction and estimation is well established, it can be difficult to actually measure the availability for some of the network components.

In general, it has been relatively easy to determine the availability of network components that sit at the core of a network and are managed closely by network operators. Any unavailability of these components will affect a large number of end users, so network operators typically closely monitor the uptime and downtime of these components.

In the case of Customer Premise Equipment (CPE) devices that are deployed at consumer's premises, availability metrics are typically much more difficult to determine. Examples of CPE devices include DSL and Cable modems, Fixed Wireless Access devices and Mobile wireless terminals. In some cases operators will want to understand the availability of a CPE device itself. This requires accurate measurements of the uptime and downtime of each CPE device in the network. However, accurate measurements of this type have been proven to be difficult to make.

The availability of a network or a component may be expressed according to the following formula:

$$\text{Availability} = \text{Uptime}/(\text{Uptime}+\text{Downtime})*100\%$$

Where Uptime is the amount of time the network or component has been providing service and downtime is the amount of time that the network or component has not been providing service. If it is possible to accurately measure the uptime and the downtime then the availability of the network or component can be determined. The availability is usually expressed as a percentage value.

The unavailability of the network or network component may be expressed according to the following equation 1:

$$\text{Unavailability}=(1-\text{Availability})=\text{Downtime}/(\text{Uptime}+\text{Downtime}) \quad [\text{Equation 1}]$$

In the case where multiple CPE are deployed in a network, an average CPE availability is usually desired. This is provided by the following equation 2:

$$\text{CPE\_Availability}=\text{All\_CPE\_uptime}/(\text{All\_CPE\_uptime}+\text{All\_CPE\_downtime}) \quad [\text{Equation 2}]$$

Where All_CPE_uptime is the sum of the uptimes of all the CPE in the network, and All_CPE_downtime is the sum of the downtimes of all the CPE in the network.

In many cases, measurements of the uptime and downtime may not be available, especially for new networks. When measurements are not available, network designers may make estimates of the availability of the network design based on component Mean Time Between Failures (MTBF) and the Mean Time To Repair/Replacement (MTTR). The MTBF of a network component may be provided by the component manufacturer. The MTTR is usually a function of how quickly a failure can be detected, how quickly the failure can be diagnosed, how quickly the failed component can be repaired or replaced, and how long it takes for the network component to be up and running in the network.

The following equation 3 shows the relationship between MTBF, MTTR and Availability:

$$\text{Availability}=\text{MTBF}/(\text{MTBF}+\text{MTTR}) \quad [\text{Equation 3}]$$

As an example calculation, for a network component with an MTBF=20,000 hours and a MTTR=4 hours, the availability is expressed as:

$$\text{Availability}=20{,}000/(20{,}000+4)=0.9998$$

Thus, it can be said that the component has an availability of 0.9998, or that the component is available 99.98% of the time.

The unavailability can be expressed according to the following equation 4:

$$\text{Unavailability}=(1-\text{Availability})=\text{MTTR}/(\text{MTBF}+\text{MTTR}) \quad [\text{Equation 4}]$$

Using the figures from the above example, the unavailability may be calculated as 1−0.9998=0.0002. Expressed as a percentage, it can be stated that the component is unavailable 0.02% of the time.

In some cases, network components are assembled from individual hardware components with little or no software implemented by the manufacturer. In the case of hardware MTBF, well established techniques such as the Telcordia TR-332 method or the methods in Mil-Hdbk-217 allow the MTBF of a hardware system to be estimated based simply on the bill of materials list of the system.

It can be more difficult to determine the MTBF of a network component that includes software components. Software faults can be the primary reason for low MTBF. Estimating MTBF for software failures can be achieved by measuring the times between when a network component becomes unavailable because of a software failure. This measurement can be done automatically through the use of timers in the network component that record the times between when a network component is restarted due to software issues.

Networks are generally built by connecting a number of network components in series or in parallel. If the availability of each network component is known, then the availability of the series or parallel network can be determined. When a number n of components are networked in a series arrangement, then the end to end availability of the network may be expressed by the following equation 5:

$$\text{Series\_Availabiltiy}=\text{product}(1, n, \text{Availability}_n) \quad [\text{Equation 5}]$$

Where $\text{Availability}_n$ is the availability of each component, and the product function calculates the product of each of the $\text{Availability}_n$ values for n in the range 1 to n.

An example of applying the series availability formula is shown in FIG. 1, which illustrates availability and unavailability of a typical Public Switched Telephone network. The example of FIG. 1 shows the unavailability of each of a series of network components and the links between the components, as well as the end to end availability and unavailability. In FIG. 1, NI refers to the network interface at a customer premises, LE is the local exchange switch and the box labeled Long Distance refers to the long distance telephone network, including switches and long distance cabling.

When network components are networked in parallel, then the end to end availability of the parallel network is given by equation 6:

$$\text{Parallel\_Availability} = 1 - \text{product}(1, n, (1-\text{Availability}_n)) \quad \text{[Equation 6]}$$

In this example, the parallel network is available if one or more of the parallel components is available.

Operators typically want to validate that individual network components or the entire network itself are meeting the availability targets that were set during the design of the network. As previously discussed, availability is easier to measure for central network components, in which relatively few components are monitored closely by the operator. However in the case of Customer Premise Equipment (CPE), where there may be millions of devices deployed for a single operator, determining an average availability for these devices is more challenging.

A typical CPE availability formula takes into account the uptime and downtime of all CPE to arrive at an average CPE availability metric according to equation 2 above. The CPE downtime in this case may consist of the times when a CPE hardware problem or CPE software problem causes the CPE to enter a state where it can no longer provide services to the end user. There may be other times where the end customer may not be provided service, but the lack of service is not a result of a problem with the CPE. These scenarios can include:
  Customer powering down the CPE.
  Customer unplugging CPE from the network.
  Power Outage at the CPE.
  Network server outage.
  Outage on a link between CPE and the central network.

In wireless networks, the link between the CPE and the network can also be broken for reasons that are not due to downtime caused by CPE HW or SW failures. These scenarios include:
  Customer repositioning the CPE, thereby breaking the RF link between the CPE and the base station.
  RF link between CPE and base station changing due to seasonal or environmental changes (e.g. a new building is built between a fixed location CPE and the serving base station, increasing the path loss between the CPE and base station).
  Wireless Base Station outage.
  Other wireless core network equipment outage such as PDSN outage, S-GW outage, P-GW outage, Media Gateway, AAA, DSN, DHCP, outage, Backhaul outage, etc.
  Power outages at the CPE.

In principle, the average CPE availability can therefore be obtained by measuring the total service outage time due to CPE hardware or software faults and the total CPE uptime, and applying equation 2.

In practice, it can be difficult to determine whether a service outage is due to a CPE hardware or software fault, or if the service outage is due to one of the other reasons listed above. For example, a wireless CPE may not be able to tell the difference between an outage due to a radio failure at the CPE and an outage due to the repositioning of the CPE to a location where it can no longer communicate with the base station. In both cases the CPE can no longer communicate with the base station, but only in the former should the outage time be logged as downtime. As shown in this example, the main difficulty with determining an average CPE availability rate is differentiating service outages due to CPE hardware or software failures from service outages due to other causes, which is not always feasible through conventional techniques.

Other scenarios, such as a CPE being powered down due to a power outage or by the customer powering down the CPE, should not be included in the CPE downtime measurement. Accounting for these distinctions precludes the use of an automated ping mechanism from the core network or base station to the CPE to monitor the CPE availability. With such a ping, it is not possible to differentiate between CPE unavailability due to a hardware/software fault and CPE unavailability due to another reason that should be excluded from any reliability/availability, calculations.

BRIEF SUMMARY OF THE INVENTION

Embodiments of the present invention are directed to a system and method for creating CPE availability metrics which differentiate between unavailability caused by the CPE and unavailability caused by factors not directly attributable to a CPE equipment failure.

DETAILED DESCRIPTION OF THE INVENTION

Embodiments of the present invention may involve a number of hardware and software components in a communication network. The invention may be embodied in a networked computer system having a network topology, a Network Resource Controller, one or more computing devices coupled to a backhaul or head-end portion of the networked computer system, a network base station, and a plurality of consumer premises equipment. The following section describes these and other hardware and software components according to embodiments of the present invention.

Figure 1:
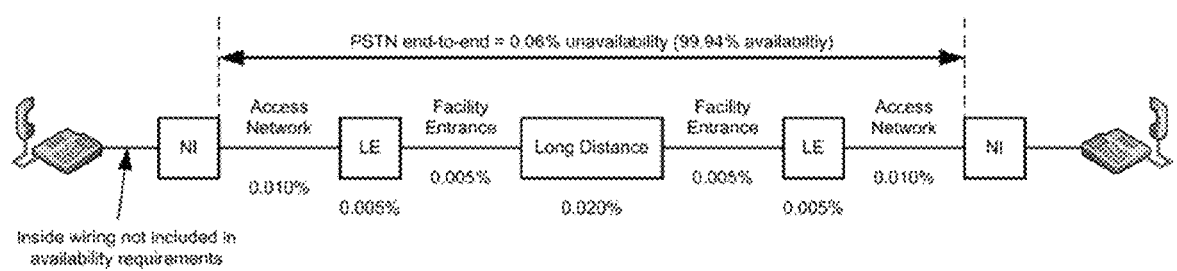
FIG. 1 illustrates availability for a public switched telephone network.
Figure 2:
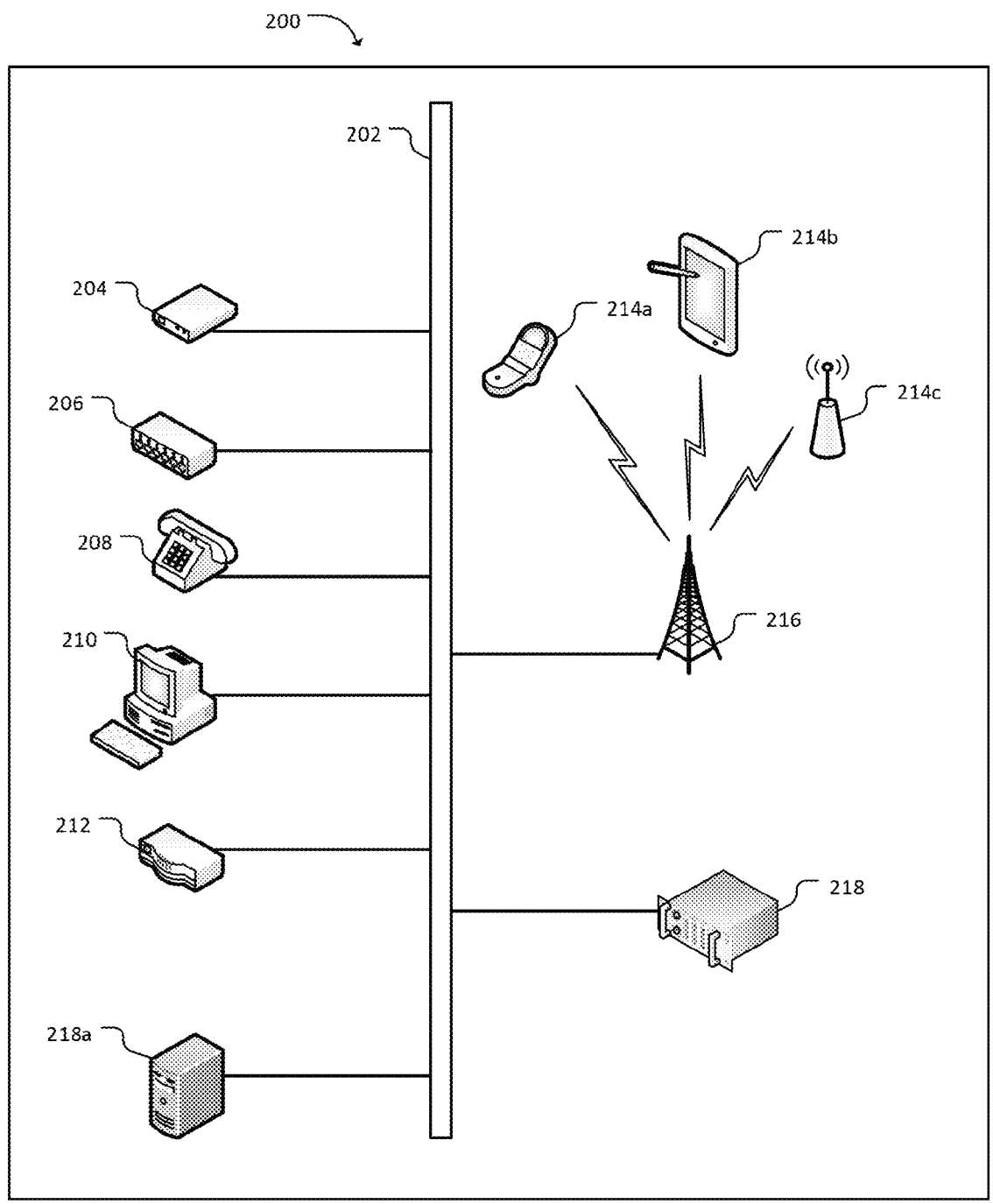
FIG. 2 illustrates a networked computing system according to an embodiment of the present invention.

In accordance with an embodiment of the present invention, FIG. 2 illustrates an availability measurement system (AMS) 200 including wired and wireless computing devices that may be present in various embodiments of the present invention. As seen in FIG. 2, an AMS 200 includes a communications network 202 and a plurality of equipment coupled to the network 202. In various embodiments, the equipment may include one or more CPE device.

For example, a system 200 may include CPE devices such as a modem 204 and a router 206. The modem 204 may be a DSL modem coupled to a wired telephone network, a cable modem coupled to a cable network, or a fiber modem coupled to an optical fiber network. In other embodiments, the modem 204 may be wirelessly coupled to communications network through a base station 216. The CPE in system 200 may further include one or more router 206 which may be included in the modem 204 or provided separately.

Other CPE which may be included in the AMS 200 includes a telephone 208, a computer 210, and a set-top box 212. Telephone 208 may be a wired or wireless telephone, and may be directly connected to telecommunications network 202 through a telephone line. In other embodiments, the telephone 208 is coupled to network 202 through a modem, a router, a computer, or similar network appliance, and may use a voice over internet protocol (VoIP) technology.

Computer 210 may be a desktop or laptop computer which includes communications equipment for which an operator wishes to collect availability metrics. For example, computer 210 may include a modem 204. Computer 210 may be any computing device with a processor and memory, including a desktop computer, tablet computer, laptop computer, or handheld computer.

Set-top box 212 may be equipment provided by an operator in order to use the operator's services through the network 202. Set top box 212 may be a cable box for cable television, or a satellite box for satellite television. In other embodiments, set top box 212 may be wired or wirelessly coupled to network 202 through a router, and may provide one or more music, television, video conferencing, gaming, or other communication service.

In some embodiments, CPE is a mobile CPE 214 which is wirelessly connected to a cellular base station 216. Examples of mobile CPE include cell phone 214a, handheld computing device 214b, and wireless access point 214c. Cell phone 214a may be any cellular telephone device which wirelessly communicates with network 202 through a base station 216 using a wireless data communications technology. In an embodiment, CPE 214 may communicate with network 202 through a communications satellite.

Portable computing device 214b may be any handheld or portable computing device that is in wireless communication with cellular base station 216. Examples of handheld computing device 214b include laptop computers, netbook computers, tablet computers, cellular phones, smartphones, PDAs, handheld gaming units, electronic book devices, personal music players, MiFi™ devices, video recorders, personal readers, and interactive glasses. The distinction between cellular telephones 214a and portable computing devices 214b is not always clear, so a single device may be categorized as one or both of these elements.

Wireless access point 214c is a device which receives information from cellular base station 216 and provides that information to one or more device which does not have cellular communication capabilities. For example, access point 214c may connect to a base station 216 in order to provide internet service to an electronic device. Access point 214c may transmit data to electronic devices through a wired or wireless connection.

Although several specific examples of CPE that may be included in AMS 200 are shown in FIG. 2, embodiments of the present invention are not limited to these examples. In general, CPE is any equipment that is at a location not controlled by an operator for which the operator wishes to collect availability data. In various embodiments, CPE may be provided by an operator or purchased by a consumer.

Base station 216, which couples wireless CPE 214 to communication network 202, may be a cellular base station using any cellular telecommunications technology, including GSM, UMTS, EVDO, 3GPP LTE, LTE Advanced, and WiMAX. Base station 216 may be include a processor, memory, and a computer readable medium with computer executable instructions stored thereon, which may control and monitor operations associated with the base station. In an embodiment, base station 216 includes a memory component which stores information associated with the availability metrics from the CPE.

A system 200 may include one or more of controller devices 218 coupled to the network 202. The controller devices 218 include processors, memory, and computer readable media with computer executable instructions stored thereon for performing various network maintenance, monitoring, and control functions. One of the computing devices 218 may be designated as an availability measurement server 218a, and collect and store information related to availability metrics from CPE 214 in accordance with embodiments of the present invention. In various embodiments, the availability measurement server 218a may be disposed at various locations within a network, including at cellular base station 216, or a location on an operator's premises. Some embodiments may collect CPE data at more than one location.

Each computing device 218, as well as certain CPE, may be configured to run any well-known operating system, including, but not limited to: Microsoft® Windows®, Mac OS®, Google® Chrome®, Linux®, Unix®, or any mobile operating system, including Symbian®, Palm®, Windows Mobile®, Google® Android®, Mobile Linux®, etc. In an embodiment, any of the computing devices 218 or any of the network base stations 216 may employ any number of common server, laptop, and personal computing devices.

In an embodiment, the backhaul portions of communication network 202 may employ any of the following common communications technologies: optical fiber, coaxial cable, twisted pair cable, Ethernet cable, and powerline cable, along with any other wireless communication technology known in the art. In an embodiment, any of the computing devices 218, the network base stations 216, and CPE may include any standard computing software and hardware necessary for processing, storing, and communicating data between each other within AMS 200.

Any of the computing devices 218 may include one or more processors, volatile and non-volatile memories, user interfaces, transcoders, modems, wireline and/or wireless communications transceivers, etc. One or more of the computing devices 218 may include one or more computer readable media encoded with a set of computer readable instructions, which when executed, can perform a portion of various processes associated with retrieving, storing, and analyzing CPE data in accordance with embodiments of the present invention.

One way to increase accuracy of CPE availability metrics is to measure the uptime and downtime at the CPE itself and store this data in non-volatile memory at the CPE. Uptime and downtime data can then be later retrieved by the access network and used to determine the CPE availability. However, this approach could still suffer from difficulties in determining the true outage time due to CPE software or hardware failures, which may be referred to as equipment failures, where the CPE may not be capable of accurately storing the downtime in its non-volatile memory. Additionally, if a CPE was replaced before the uptime and downtime information stored in its memory could be retrieved then this data would not be included in any CPE availability calculations. Accordingly, embodiments of the present invention include techniques for accounting for increasing the accuracy of availability measurements.

An alternative metric to pure CPE availability is CPE Service availability. CPE Service availability refers to the service availability seen by an end user of a CPE. CPE Service availability can be more easily determined than the traditional CPE availability, and may ultimately be a more useful metric for an operator since it provides an availability figure that includes the effects of the availability of all the network components. This results in an availability metric that more closely mirrors what the end user perceives.

The average CPE Service availability metric may be calculated according to the following equation 7:

$$\text{Service\_Availability} = \frac{\text{All\_Service\_uptime}}{(\text{All\_Service\_uptime} + \text{All\_Service\_downtime})} \quad \text{[Equation 7]}$$

where All_Service_uptime is the sum of the times where communications services are available at each of the CPE in a network, and All_Service_downtime is the sum of the times where communications services are not available for each of the CPE in the network.

Service downtime may include downtime due to failure of any network equipment, including the core network servers, backhaul, media gateway, DSN, DHCP server, etc., and in the case of wireless CPEs, the access network including the base station. In an embodiment, CPE has data which indicates the network equipment associated with a service failure.

Figure 3:
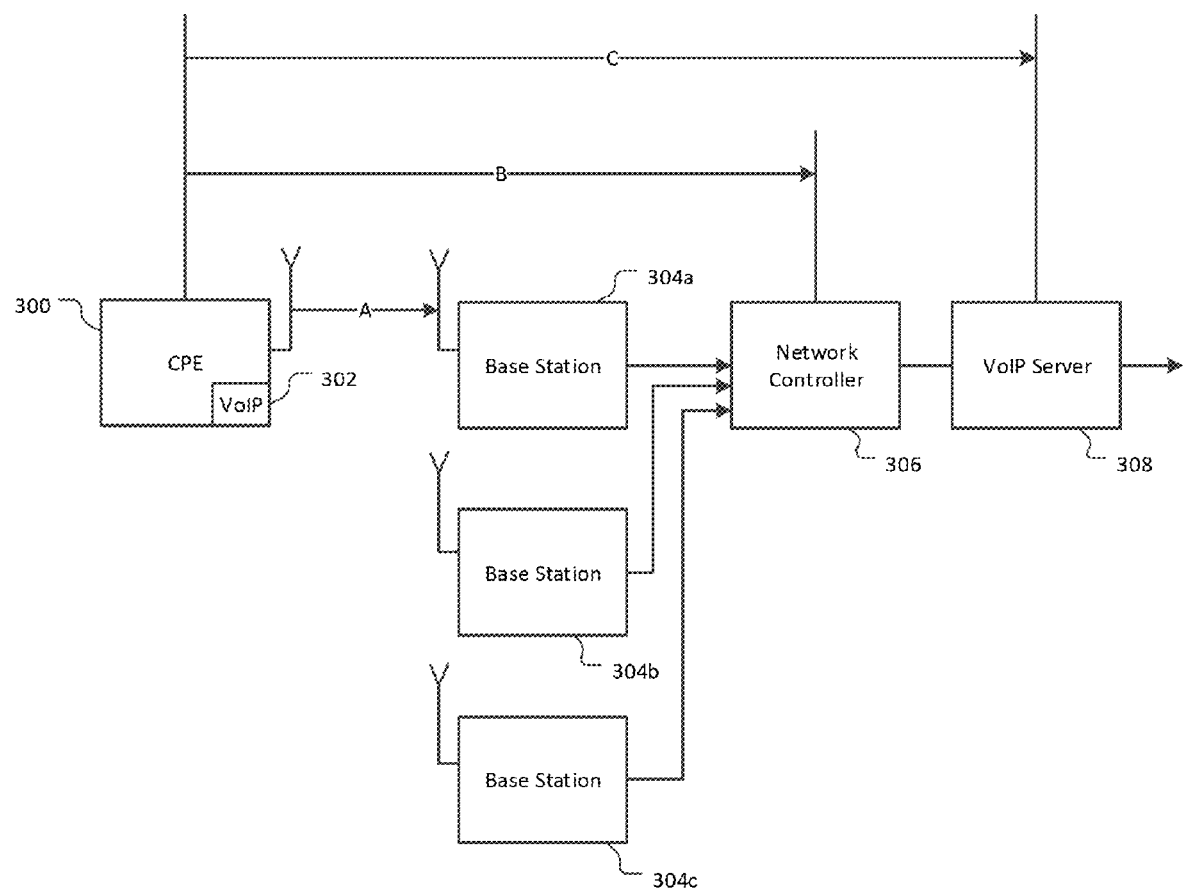
FIG. 3 illustrates wireless service communication points according to an embodiment of the present invention.

For example, as seen in the embodiment of FIG. 3, CPE 300 includes a VoIP module 302, and is wirelessly coupled to base station 304a. Each of base stations 304a, 304b, and 304c are coupled to network controller 306, and network controller 306 is coupled to VoIP Server 308. CPE 300 may receive data from any of the base station 304a, network controller 306, and VoIP server 308 indicating that communications were successfully transmitted to and processed by the particular network equipment. These three paths of communication are illustrated in FIG. 3 by "A," "B," and "C," respectively. When a communication fails, the equipment responsible for the failure may not send data to the CPE, so it is possible to derive a point of failure from information received by the CPE.

For example, if there is a failure at VoIP server 308 and CPE 300 attempts a communication, Network Controller 306 may send CPE 300 information indicating that it successfully received and processed the communication, while VoIP server 308 does not send information to CPE. Accordingly, CPE 300 can determine that VoIP server 308 is the source of the service outage. In an embodiment, when CPE 300 receives information indicating service failure due to non-CPE network equipment, the CPE records this information in a non-volatile memory.

In an embodiment, the average service availability may be obtained by recording in non-volatile memory at the CPE when a downtime period starts and ends, and then applying Equation 7. Further refinements may be made using data indicating which piece of network equipment is the cause of the service failure.

As discussed above, complications could occur in situations where a CPE is powered up or powered down. Consider for example the following sequence:
1. A CPE is operating without issues.
2. A network issue occurs which causes service to be unavailable at the CPE.
3. The start of the downtime period is recorded at the CPE.
4. The CPE is then powered off for a long period of time.
5. While the CPE is powered off, the network issue that causes the service downtime is resolved.
6. The CPE is powered back on at some later time, at which point the CPE notes that service is now available.
7. The start of the service availability is recorded at the CPE.

In the above sequence, the recorded time difference between the start of the service downtime period and the start of the service uptime period is lengthened by the fact that the CPE was powered off at the time that service was restored.

Alternatively, the following scenario can also occur:
1. A CPE is operating without issues.
2. The CPE is then powered off for a long period of time.
3. A network issue occurs which would cause service to be unavailable at the CPE.
4. The CPE is powered back on at some later time, at which point the CPE notes that service is down.
5. The start of the service unavailability period is logged at the CPE.

In this scenario, the time at which the service unavailability period begins is not accurately recorded because the CPE was powered off when the actual beginning of the unavailability period occurred.

These issues can be avoided if a CPE can detect that it is in the process of being powered off and just before power is completely lost, the CPE stores the time at which the power-off event is taking place in non-volatile memory. The total time during which the CPE is powered off can be removed from the access failure or access success time as appropriate.

In an embodiment, CPE may periodically log an availability status and a time stamp in a memory. The periodicity may be a regular interval, such as every second, every minute, every five minutes, or every hour. The interval may vary between different embodiments to adjust the precision of the availability data.

In an embodiment with periodic availability logs, access failures or successes that occur between logging events may not be recorded. In addition, the type and capacity of memory in a periodically logging embodiment may be different from other embodiments. Most types of non-volatile memory are only capable of a limited number of read-write cycles. Thus, periodically logging embodiments may use a larger amount of memory, or a more stable type of memory, from other embodiments. Because of the limited amount of data that is recorded, write and read times are less of a concern for the logging operations than for other computing operations.

Figure 4:
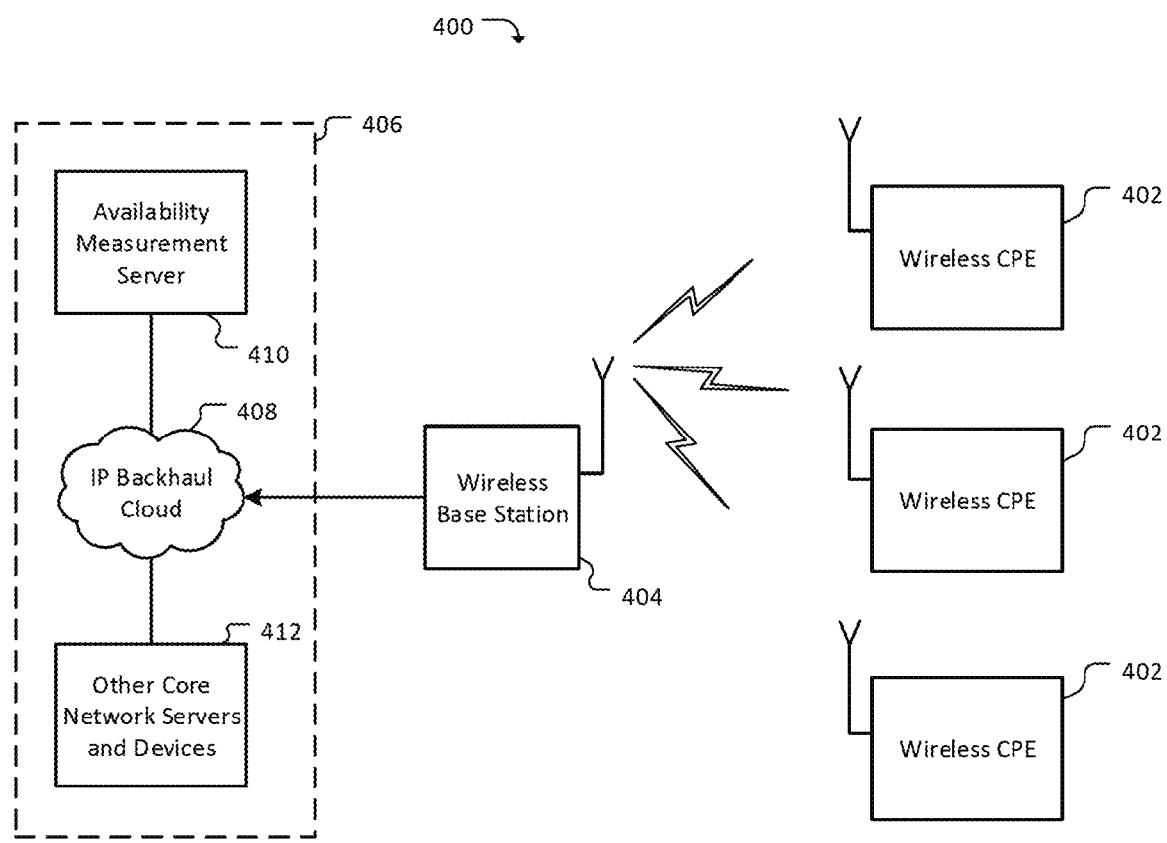
FIG. 4 illustrates network architecture according to an embodiment of the present invention.

FIG. 4 illustrates of network architecture in an embodiment using wireless CPE devices 402. Wireless base station 404 communicates with the wireless CPE devices 402 over a wireless link. Base station 404 is coupled to a core network 406.

FIG. 4 shows the core network 406 as comprising an IP backhaul cloud 408, an availability measurement server 410, and other core network servers and devices 412. The backhaul cloud 408 connects wireless base station 404 to availability measurement server 410. In the embodiment of FIG. 4, availability measurement server 410 is a computer component that performs functions associated with availability metrics, including collecting and analyzing CPE availability data. In other embodiments, these functions may be distributed among more than one computing device associated with the network. In the embodiment shown in FIG. 4, the backhaul is IP based, but other embodiments may have a backhaul based on other technologies, such as circuit switches or other packet data switching systems.

Figure 5:
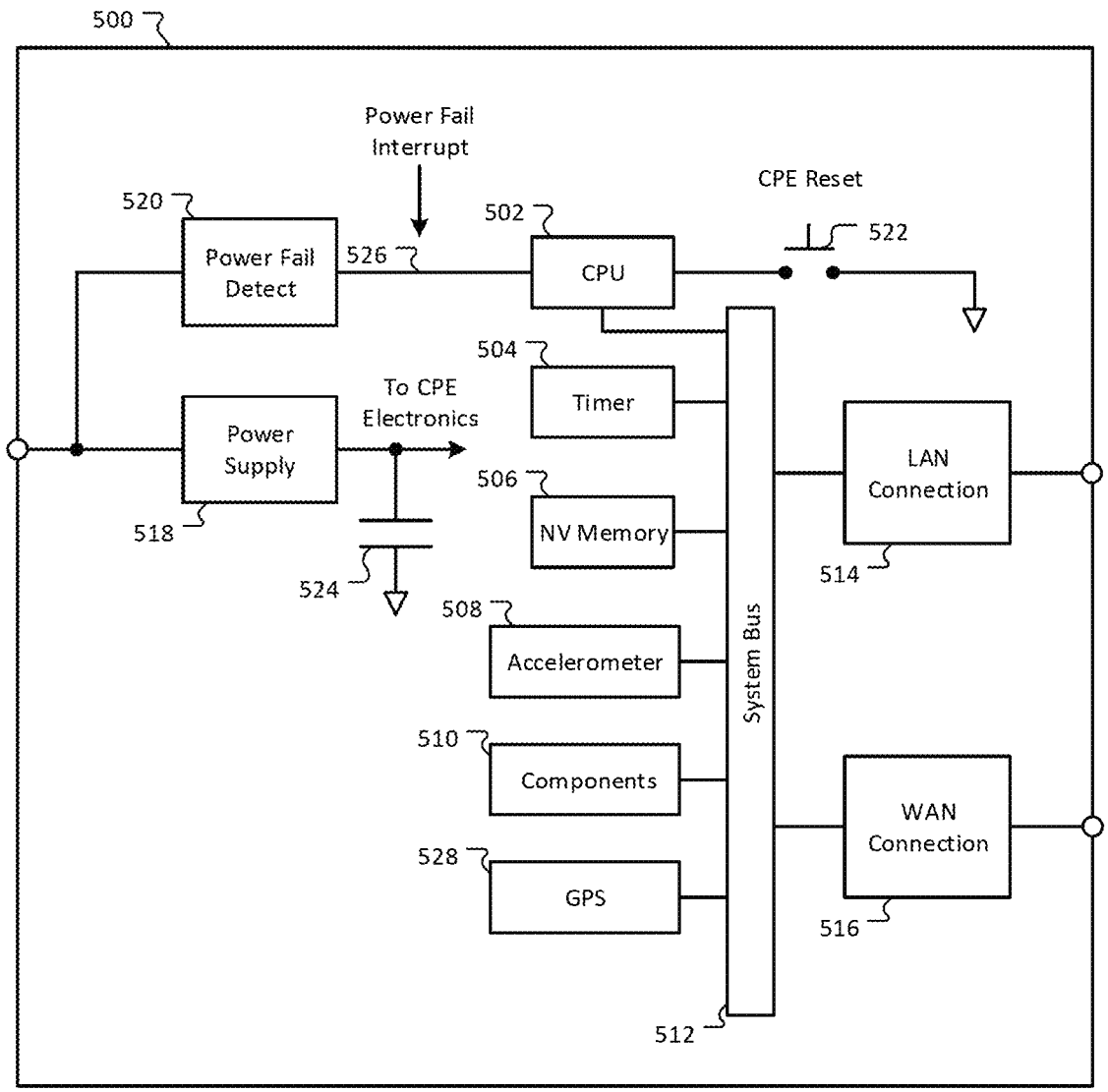
FIG. 5 illustrates consumer premises equipment according to an embodiment of the present invention.

FIG. 5 is a block diagram illustrating components of CPE 500 for determining availability metrics according to embodiments of the present invention. CPE 500 includes a central processing unit (CPU) 502, timer 504, non-volatile memory 506, and a system bus 512. The system bus 512 facilitates communication between the timer 504, CPU 502, and non-volatile memory 506, so that the CPU 502 can read the timer 504 and write data to non-volatile memory 506.

Memory 506 may be any form of non-volatile memory, including flash memory, MRAM, Fe-RAM, PC-RAM, nvS-RAM, NRAM, etc. As discussed above, the particular type and size of memory may vary between embodiments according to considerations such as how much data is to be recorded, endurance, and cost.

Other components of CPE 500 include WAN connection 516 and LAN connection 514. WAN connection 516 has different forms in different CPE 500. For example, WAN connection 516 may be a radio transceiver when CPE 500 is a wireless cellular telephone, a DSL connection when CPE 500 is a DSL modem, a cable connection when CPE 500 is a cable modem, etc. LAN connection 514 is optional, and may be any standard LAN connection type such as Ethernet 100BaseT.

Other components of CPE 500 may include power supply 518, power fail detection block 520, reset switch 522, capacitor 524, accelerometer 508, components 510, and GPS unit 528. Components 510 may include a variety of electronic components that perform core functions of the CPE, and may include volatile system memory such as DRAM.

In an embodiment, timer 504 keeps track of the amount of time that the CPE 500 has been powered on. During the normal course of operation, the CPE 500 may also obtain the current real time, either from an internal real time clock (not shown), or from messages received from an external source such as a base station or the core network. In such an embodiment, once the CPE 500 determines the current real time, it can store the power on time of the CPE 500 in non-volatile memory 506. In an embodiment, the power on time is the current real time minus the current timer value, which is assumed to start at zero at power-on. The CPE 500 may record in non-volatile memory 506 the total amount of time that it is successfully communicating with the access network (base station) and/or the core network, as well as the amount of time that it fails to communicate with the access network and/or core network.

The CPE 500 may detect and record multiple types of service availability. For example, in an embodiment where CPE 500 is a wireless device coupled to a base station in a telecommunications network, CPE 500 could record in non-volatile memory 506 the amount of time it is communicating with an access network (base station), as well as the amount of time it can communicate with a session initiation protocol (SIP) server 308 for providing VoIP service, as shown in FIG. 3. In such an embodiment, different service availability metrics can be calculated for basic service availability from the access network, as well as service availability from the VoIP network.

In some embodiments, the impact of an unavailable server on the user population could be determined. For example, if a CPE detects that it cannot communicate with a SIP server, this information is normally incorporated into the service availability metrics. However, if a CPE does not try to make voice calls during the service outage then this does not impact this customer. Therefore, in an embodiment, separate availability metrics are kept for CPEs that attempt to actually use a service that is not available, and CPEs that detect that a service is not available, but don't attempt to make use of that service while it is unavailable.

Figure 6:
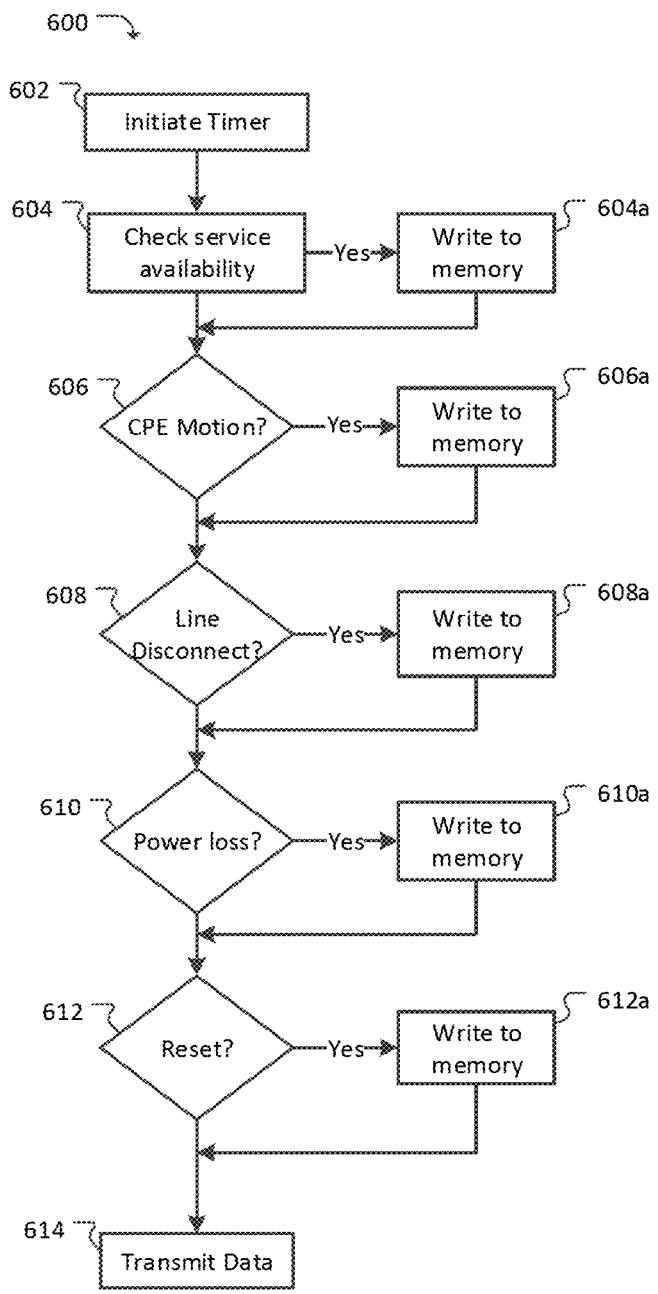
FIG. 6 illustrates a method for generating data according to an embodiment of the present invention.

An embodiment of a process 600 for generating data to calculate an availability metric according to the present invention is illustrated in FIG. 6. For the sake of clarity, the embodiment measures the availability of the access network by the CPE. In this example, the access failure time can be determined by recording the time that elapses between the first access failure in a sequence of failed access attempts and the next access success. Similarly, the access success time can be determined by recording the time that elapses between the first successful access attempt in a sequence of access attempts and the next access failure.

In process 602, the timer 504 is started. In an embodiment, the timer is started when power is provided to the CPE. Process 602 may also include obtaining the real time to associate timer values with real time values. Obtaining the real time may be accomplished by reading a value in a separate timer, receiving a time value from an external source, etc.

In process 604, the CPE determines whether network service is available. An initial check for service availability may be conducted through a connection attempt, where an unsuccessful attempt is a determination that service is not available. After network communications are established, a loss of network communications may be a determination that service is not available. In some embodiments, determining service availability may comprise pinging a remote server.

If a change in service availability is detected, in step 604*a* the CPE records the status and the time of the change in non-volatile memory. In some embodiments, recording the availability status in memory is performed when status is first detected and when status changes. In other embodiments, as discussed above, availability status is periodically recorded in the memory at regular intervals.

As discussed above with respect to FIG. 3, when service is not available, process 604 of determining whether service is available may include determining the point of service failure, which is the network equipment responsible for services not being available to the CPE. For example, in an embodiment where a CPE is wirelessly coupled to a base station, the CPE records the base station to which it was most recently communicating when the access failures started occurring and other communication metrics from the WAN connection. This information may be used at a later time to correlate access failures across multiple CPE devices.

In an embodiment in which a CPE is wirelessly coupled to a base station, the RF link between the CPE and the base station may be lost if the user moves the CPE to a location where it cannot receive the base station transmissions. In this case, service at the CPE is lost and would normally be considered to be a service outage. However, in such a case, the operator may not want to include this type of outage in the CPE availability calculations.

One way in which this can be accounted for is to use data from an accelerometer in the CPE, such as accelerometer 508 shown in FIG. 5. If the CPE is being moved at the same time that the signal is lost, then the accelerometer will detect this movement in process 606 and the CPE may record to the non-volatile memory information indicating that movement was detected at the time of the signal loss in process 606*a*. In an embodiment, when the CPE service availability is being calculated, those times that the CPE was being moved when the connection to the base station was lost may be deducted from the access failure times.

In other embodiments, motion may be detected in other ways. For example, an accelerometer may not detect user motion when a user is in a moving vehicle. In such an embodiment, the CPE may be equipped with a GPS receiver. If the GPS receiver detects motion at a time when service availability is lost in process 606, the CPE may record motion information along with the loss in service in memory in process 606*a*.

In another embodiment, user motion may be differentiated from network and equipment issues through the slope of a signal strength curve recorded by the CPE, where a gradual loss is recorded as a user motion event, and a very abrupt loss is counted as a service outage. In such an embodiment, a signal loss which diminishes over a time frame longer than a few 100's of milliseconds may correspond to a user moving behind a radio barrier, while a service loss which is included in service availability metrics may occur when the received signal strength drops at a faster rate, e.g., over a few tens of milliseconds or less.

There may be other cases where service is lost and that these losses of service can be correlated with events that occur at the CPE. In an embodiment, CPE may detect when a user unplugs a service line from a wired CPE. For example, the CPE may detect when a phone line is unplugged from a DSL modem, or when a cable is unplugged from a cable modem. Such events are caused by user interaction, and may be accounted for by not including outages caused by such events in service unavailability metrics.

Accordingly, in an embodiment, process 608 includes detecting when a service line is removed from CPE. The line removal, and the time at which the removal was detected, may be recorded in memory in process 608a. Line removal may be detected by circuitry or components that detect whether a service line is physically and/or electrically connected to the CPE. In another embodiment, line disconnection may be detected by detecting a loss of signal WAN connection 516.

As seen in FIG. 5, the power fail detection block 520 at the power supply input to the CPE 500 detects if external power to the CPE has been removed. External power may be removed by a user initiated event such as removal of a power plug from a CPE, or some other event not related to service availability, such as a general power outage or a battery running out of power. In an embodiment, interrupt line 526 from the power fail detection block 520 interrupts the CPU 502 to let it know that the external power has gone away.

In an embodiment, even though the external power has been removed, the CPE 500 maintains a power reserve to ensure that the CPU 502 or other circuitry has sufficient time to store a power lost record in non-volatile memory 506. As seen in FIG. 5, a capacitor 524 is used to indicate that the power is maintained at the CPE electronics for some period of time after the external power is lost. While some embodiments may use a capacitor 524, other embodiments may use a battery or other mechanism to retain sufficient power to record power loss information in memory 506.

In process 610, power loss for a CPE is detected. When power loss is detected, process 610a is performed, which may include recording power loss and time information in non-volatile memory 506. The power loss information stored in the non-volatile memory may include a raw timer value indicating the amount of time the CPE was powered on, a current real time indicating the time at which power was lost, and access success and access failure times. In an embodiment, processes 610 and 610a are performed when a user turns off a CPE by pressing a power off button.

Similarly, process 612 detects when CPE 500 is reset, and when a reset is detected, data associated with the reset event is recorded in memory in process 612a. A reset may occur when a user presses a reset button, or otherwise instructs CPE to reset, such as through a software instruction. Information that may be recorded in process 612a includes the reset event, the current timer value, the current real time, and the access failure and access success times.

In process 614, service availability information such as information gathered in process 604 to 612 discussed above is transmitted to one or more component of AMS 200, such as base station 216 and availability management server 218. Information gathered in processes 606 to 612 may be referred to as information indicating a lack of service due to customer premises conditions, or information indicating a lack of service not associated with an equipment failure.

The information may be sent periodically by the CPE, such as once per day, when certain events such as restoration of service occur or in response to a request by an operator technician at any time. In another embodiment, a performance metrics system may already be gathering the CPE up time and down time, etc. and storing it at a Performance Metrics (PM) database. In such an embodiment, the AMS can pull the CPE data from the PM database and perform service metric calculations.

In addition, the AMS can gather additional service time data from each CPE that may not yet be stored in the non-volatile memory of CPE. The AMS may examine the power on and power off data collected from the CPEs to determine the total amount of time each CPE device was powered on.

The timestamps recorded by CPE memory are designed to be sufficient to allow the CPE system availability to be determined. In an embodiment, the service availability may be calculated directly from the access success and access failure times gathered from multiple CPEs according to equation 8:

$$serviceAvailability = \frac{TotalTimeAccessSuccesses}{(TotalTimeAccessSuccesses + TotalTimeAccessFailures)} \quad \text{[Equation 8]}$$

In equation 8, TotalTimeAccessFailures is the sum of the times during which each CPE cannot access the network and TotalTimeAccessSuccesses is the sum of the times during which each CPE can access the network.

In an embodiment including wireless CPEs, the AMS may examine the records pulled from each CPE for indications that a RF outage occurred when the CPE was being moved. If this is the case, then the service outage time as a result of the CPE being moved is not included in the service availability calculations. After making the appropriate adjustments for CPE power on and power off events and other events described with respect to processes 606 to 612, the AMS calculates the average CPE service availability metric.

In an embodiment, the AMS can correlate data from multiple CPE devices to help differentiate between access failures/outages caused by base station or head-end equipment outages, as discussed with respect to FIG. 3. If multiple CPE started recording access failures at the same base station or head end server around the same time, then this is indicative of a base station or head-end failure. In this case the AMS can subtract the access failure time for these CPEs from the total access failure time. This provides a second CPE availability metric that can be interpreted as the CPE availability due to CPE hardware and software problems, as well as CPE being repositioned, or otherwise disconnected from the WAN.

While several embodiments of the present invention have been illustrated and described herein, changes can be made without departing from the spirit and scope of the invention. Accordingly, the scope of the invention is not limited by any disclosed embodiment. Instead, the scope of the invention should be determined from the appended claims that follow.

What is claimed is:

1. A system for determining availability metrics for customer premises equipment (CPE), the system comprising:
   a processor; and
   a non-transitory computer readable medium with computer executable instructions stored thereon, which, when executed by the processor, perform the following method:
   receiving data from a plurality of CPEs; and
   calculating a service availability metric using the data, wherein the data includes service availability information and a time stamp associated with a service availability status, the service availability information including data indicating a loss of power to a CPE of the plurality of CPEs and data indicating that a communication wire was removed from a CPE of the plurality of CPEs, wherein calculating the service availability metric includes parsing the data so that times during which service was not made available at the CPE due to a loss of power and removal of a communication wire are not included in the service availability metric.

2. The system of claim 1, wherein the data indicating the loss of power to the CPE is stored in a non-volatile memory of the CPE after power is removed from the CPE.

3. The system of claim 1, wherein the service availability information includes data indicating that a reset operation was performed by a CPE of the plurality of CPEs.

4. The system of claim 1, wherein the plurality of CPEs communicate wirelessly with base stations, and the service availability information includes data indicating that signal loss occurred at a CPE of the plurality of CPEs by moving out of range from a base station.

5. The system of claim 4, wherein the information indicating that the CPE lost communication includes accelerometer information.

6. The system of claim 1, wherein the service availability information is information recorded by the plurality of CPEs on a periodic basis.

7. The system of claim 1, wherein the service availability information includes an identity of network equipment which is responsible for network services not being made available to the CPE.

8. The system of claim 1, wherein the service availability metric is a percentage of time that the service is available.

9. A method for calculating a communications network availability metric, the method comprising:

receiving data from a plurality of customer premises equipment (CPEs); and calculating a service availability metric using the data, wherein the data includes service availability information indicating a lack of service due to a condition not associated with an equipment failure, and a time stamp associated with the service availability status, the service availability information including data indicating a loss of power to a CPE of the plurality of CPEs and data indicating that a communication wire was removed from a CPE of the plurality of CPEs, wherein calculating the service availability metric includes parsing the data so that times during which service was not available at the CPE due to a loss of power and removal of a communication wire are not included in the service availability metric.

10. The method of claim 9, wherein the customer premises condition is the CPE moving out of service range.

11. The method of claim 9, wherein the service availability metric is a percentage of time that the service is available.

* * * * *